(12) United States Patent
Urano et al.

(10) Patent No.: US 10,401,868 B2
(45) Date of Patent: Sep. 3, 2019

(54) AUTONOMOUS DRIVING SYSTEM

(71) Applicant: TOYOTA JIDOSHA KABUSHIKI KAISHA, Aichi-ken (JP)

(72) Inventors: Hiromitsu Urano, Numazu (JP); Junya Watanabe, Shizuoka-ken (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/824,472

(22) Filed: Nov. 28, 2017

(65) Prior Publication Data

US 2018/0157271 A1   Jun. 7, 2018

(30) Foreign Application Priority Data

Dec. 6, 2016   (JP) ................. 2016-236949

(51) Int. Cl.
*G05D 1/02* (2006.01)
*B60Q 1/46* (2006.01)
*G05D 1/00* (2006.01)
*B60W 50/00* (2006.01)
*B60W 30/06* (2006.01)
*B60W 30/192* (2012.01)

(52) U.S. Cl.
CPC .......... *G05D 1/0274* (2013.01); *B60Q 1/46* (2013.01); *B60W 30/06* (2013.01); *B60W 30/192* (2013.01); *B60W 50/0098* (2013.01); *G05D 1/0088* (2013.01); *G05D 2201/0212* (2013.01)

(58) Field of Classification Search
CPC ............. G05D 1/0274; G05D 1/0088; G05D 2201/0212; B60Q 1/46

USPC ........................................................ 701/25
See application file for complete search history.

(56) References Cited

U.S. PATENT DOCUMENTS

| 8,825,258 B2 | 9/2014 | Cullinane et al. |
| 8,880,270 B1 | 11/2014 | Ferguson et al. |
| 2010/0253539 A1* | 10/2010 | Seder ............... G01S 13/723 340/903 |

(Continued)

FOREIGN PATENT DOCUMENTS

| JP | 2015133050 A | 7/2015 |
| JP | 2016-028318 A | 2/2016 |

(Continued)

*Primary Examiner* — Gertrude Arthur Jeanglaude
(74) *Attorney, Agent, or Firm* — Sughrue Mion, PLLC

(57) ABSTRACT

An autonomous driving system includes a waypoint destination database storing waypoint destination data associating a type of a waypoint destination with a preset action of a vehicle. The waypoint destination is a destination that the vehicle visits before arriving at a predetermined destination. The autonomous driving system includes an electronic control unit. The electronic control unit is configured to autonomously drive the vehicle toward the predetermined destination, set the waypoint destination, present the preset action performed at the waypoint destination, to an occupant of the vehicle, based on the waypoint destination and the waypoint destination data. The electronic control unit is configured to determine whether the preset action is permitted by the occupant, and cause the autonomously driven vehicle to perform the preset action at the waypoint destination when it is determined that the preset action is permitted by the occupant.

8 Claims, 7 Drawing Sheets

(56) References Cited

U.S. PATENT DOCUMENTS

| | | | | |
|---|---|---|---|---|
| 2010/0253542 A1* | 10/2010 | Seder | ............... | G01S 7/22 |
| | | | | 340/932.2 |
| 2013/0110343 A1 | 5/2013 | Ichikawa et al. | | |
| 2014/0320318 A1* | 10/2014 | Victor | ............... | G08G 1/142 |
| | | | | 340/932.2 |
| 2015/0360617 A1 | 12/2015 | Schulz et al. | | |

FOREIGN PATENT DOCUMENTS

| | | |
|---|---|---|
| JP | 2016-115356 A | 6/2016 |
| WO | 2011/158347 A1 | 12/2011 |
| WO | 2016/092796 A1 | 6/2016 |

\* cited by examiner

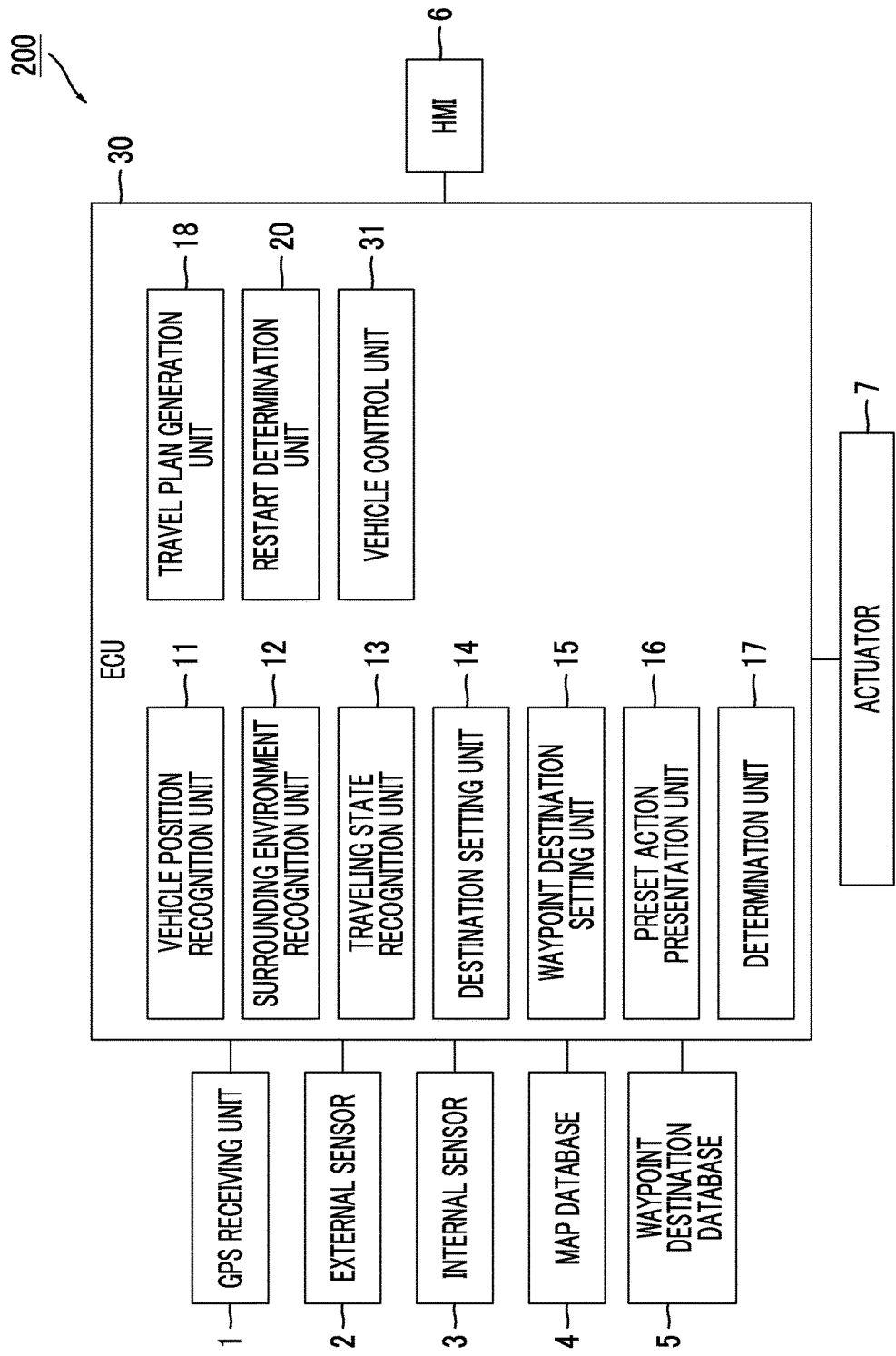

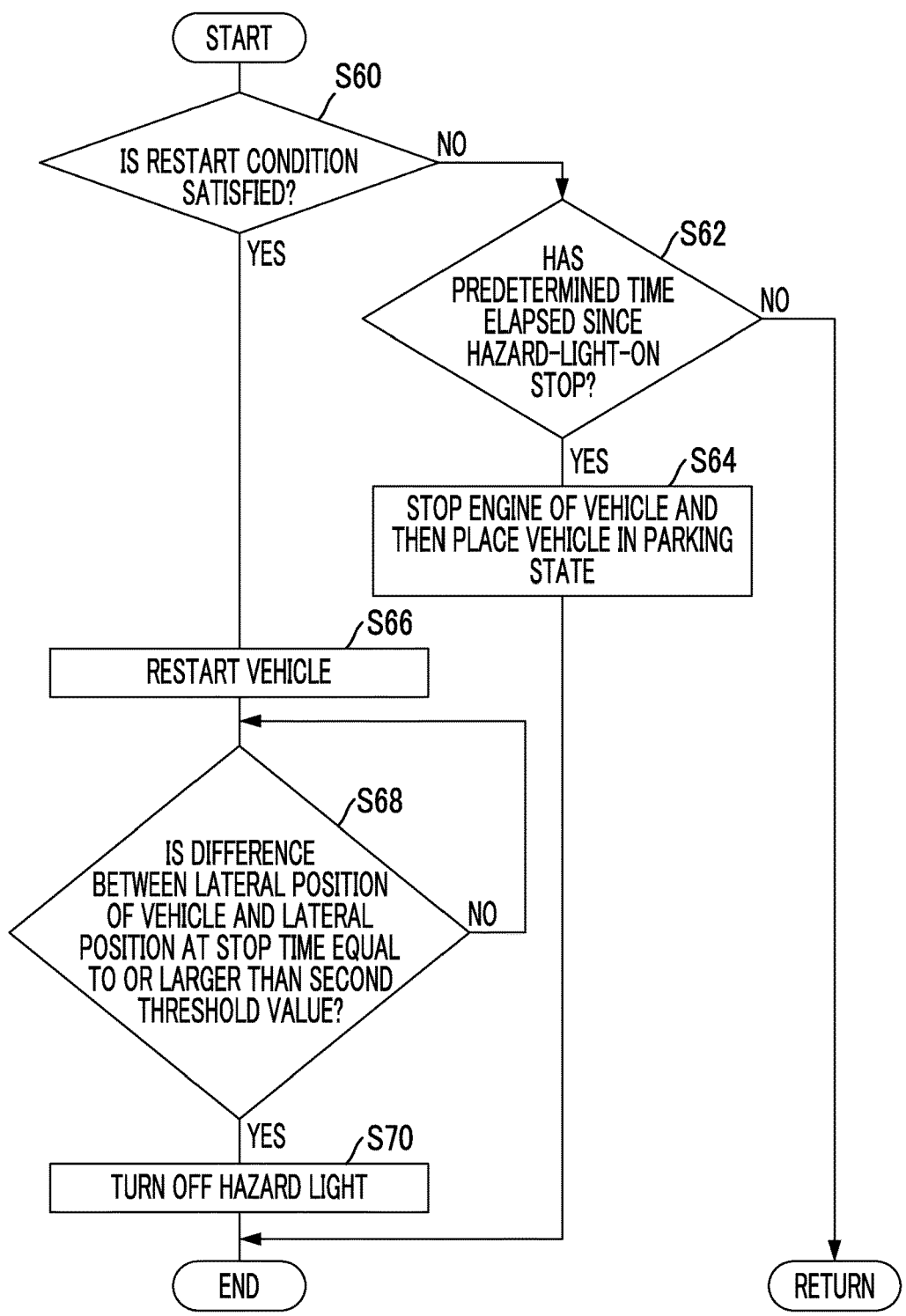

AUTONOMOUS DRIVING SYSTEM

INCORPORATION BY REFERENCE

The disclosure of Japanese Patent Application No. 2016-236949 filed on Dec. 6, 2016 including the specification, drawings and abstract is incorporated herein by reference in its entirety.

BACKGROUND

1. Technical Field

The present disclosure relates to an autonomous driving system.

2. Description of Related Art

As a technical document relating to an autonomous driving system, WO2011/158347 is known. This publication describes a device that starts the autonomous driving of a vehicle when an autonomous driving switch is operated wherein, when a destination is already set when the autonomous driving switch is operated, the device generates a course from the current position to the destination and then starts autonomous driving.

SUMMARY

Meanwhile, an occupant sometimes sets not only a destination but also a waypoint destination that the occupant wants to visit before arriving at the destination. At such a waypoint destination, since an autonomously driven vehicle is required to take an action different from that at the final destination, the vehicle should be autonomously driven preferably by considering an action in accordance with the waypoint destination.

The present disclosure provides an autonomous driving system that can cause a vehicle to take an appropriate action in accordance with a waypoint destination during autonomous driving.

An aspect of the present disclosure provides an autonomous driving system. The autonomous driving system according to the aspect includes a waypoint destination database storing waypoint destination data associating a type of a waypoint destination with a preset action of a vehicle. The waypoint destination is a destination that the vehicle visits before arriving at a predetermined destination. The autonomous driving system includes an electronic control unit configured to autonomously drive the vehicle toward the predetermined destination, set the waypoint destination, present the preset action performed at the waypoint destination, to an occupant of the vehicle, based on the waypoint destination and the waypoint destination data, determine whether the preset action is permitted by the occupant, and cause the autonomously driven vehicle to perform the preset action at the waypoint destination when it is determined that the preset action is permitted by the occupant.

With the above configuration, when a waypoint destination is set, the autonomous driving system can present a preset action, associated with the type of the waypoint destination, to the occupant. When the occupant permits the preset action, the autonomous driving system causes the vehicle to perform the preset action at the waypoint destination, allowing the vehicle to perform an appropriate action corresponding to the waypoint destination during autonomous driving.

In the aspect, in the waypoint destination database, the type of the waypoint destination may include a road shoulder stop location, and the preset action of the vehicle associated with the road shoulder stop location may include a hazard-light-on stop of the vehicle. The hazard-light-on stop may be a stopped state in which the autonomously driven vehicle stops with a hazard light turned on or blinking. The electronic control unit may be configured to present the hazard-light-on stop to the occupant as the preset action when the type of the waypoint destination is the road shoulder stop location, and cause the autonomously driven vehicle to perform the hazard-light-on stop at the waypoint destination when it is determined that the hazard-light-on stop is permitted by the occupant.

With the above configuration, when a road shoulder stop location is set as the waypoint destination and a hazard-light-on stop is permitted as the preset action, the autonomous driving system can cause the vehicle to perform the hazard-light-on stop at the waypoint destination.

In the aspect, the electronic control unit may be configured to store a lateral position of the vehicle at a start of the hazard-light-on stop as a reference lateral position when the autonomously driven vehicle performs the hazard-light-on stop at the waypoint destination, determine whether a preset restart condition is satisfied when the vehicle performs the hazard-light-on stop at the waypoint destination, restart the vehicle when it is determined that the preset restart condition is satisfied, and turn off the hazard light of the vehicle turned on at the time of the hazard-light-on stop, when a difference between a lateral position of the restarted vehicle and the reference lateral position becomes less than a first threshold value.

With the above configuration, after the vehicle that performed the hazard-light-on stop at the waypoint destination has restarted, the autonomous driving system turns off the hazard light when the lateral position of the vehicle becomes almost coincident with the lateral position at the start of the hazard-light-on stop. This means that the hazard light of the vehicle that was turned on at the time of the hazard-light-on stop can be turned off at an appropriate timing.

In the aspect, the electronic control unit may be configured to determine whether a preset restart condition is satisfied when the vehicle performs the hazard-light-on stop at the waypoint destination, restart the vehicle when it is determined that the preset restart condition is satisfied, and turn off the hazard light of the vehicle turned on at the time of the hazard-light-on stop, when a difference between a lateral position of the restarted vehicle and a lateral position of the vehicle in the stopped state by the hazard-light-on stop becomes equal to or larger than a second threshold value.

With the above configuration, after a vehicle that performed a hazard-light-on stop at a waypoint destination has restarted, the autonomous driving system turns off the hazard light when the difference between the lateral position of the vehicle and the lateral position of the vehicle in the stopped state by the hazard-light-on stop becomes equal to or larger than the second threshold value. This means that the hazard light of the vehicle that was turned on at the start of the hazard-light-on stop can be turned off at an appropriate timing.

In the aspect, the road shoulder stop location may include a location where there is no available parking space.

In the aspect, whether the preset restart condition is satisfied may be determined based on a detection result of a sensor mounted in the vehicle or based on whether or not a restart instruction is received from the occupant.

In the aspect, in the waypoint destination database, the type of the waypoint destination may include a parking space available location having a parking space where the vehicle parks and the preset action of the vehicle associated with the parking space available location includes parking of the vehicle. The electronic control unit may be configured to present the parking to the occupant as the preset action when the type of the waypoint destination is the parking space available location, and cause the autonomously driven vehicle to perform the parking at the waypoint destination when it is determined that the parking is permitted by the occupant.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 6 is a block diagram showing an autonomous driving system according to a second embodiment; and FIG. 7 is a flowchart showing restart processing after a hazard-light-on stop according to the second embodiment.

DETAILED DESCRIPTION OF EMBODIMENTS

Embodiments of the present disclosure will be described in detail below with reference to the drawings.

First Embodiment

Figure 1:
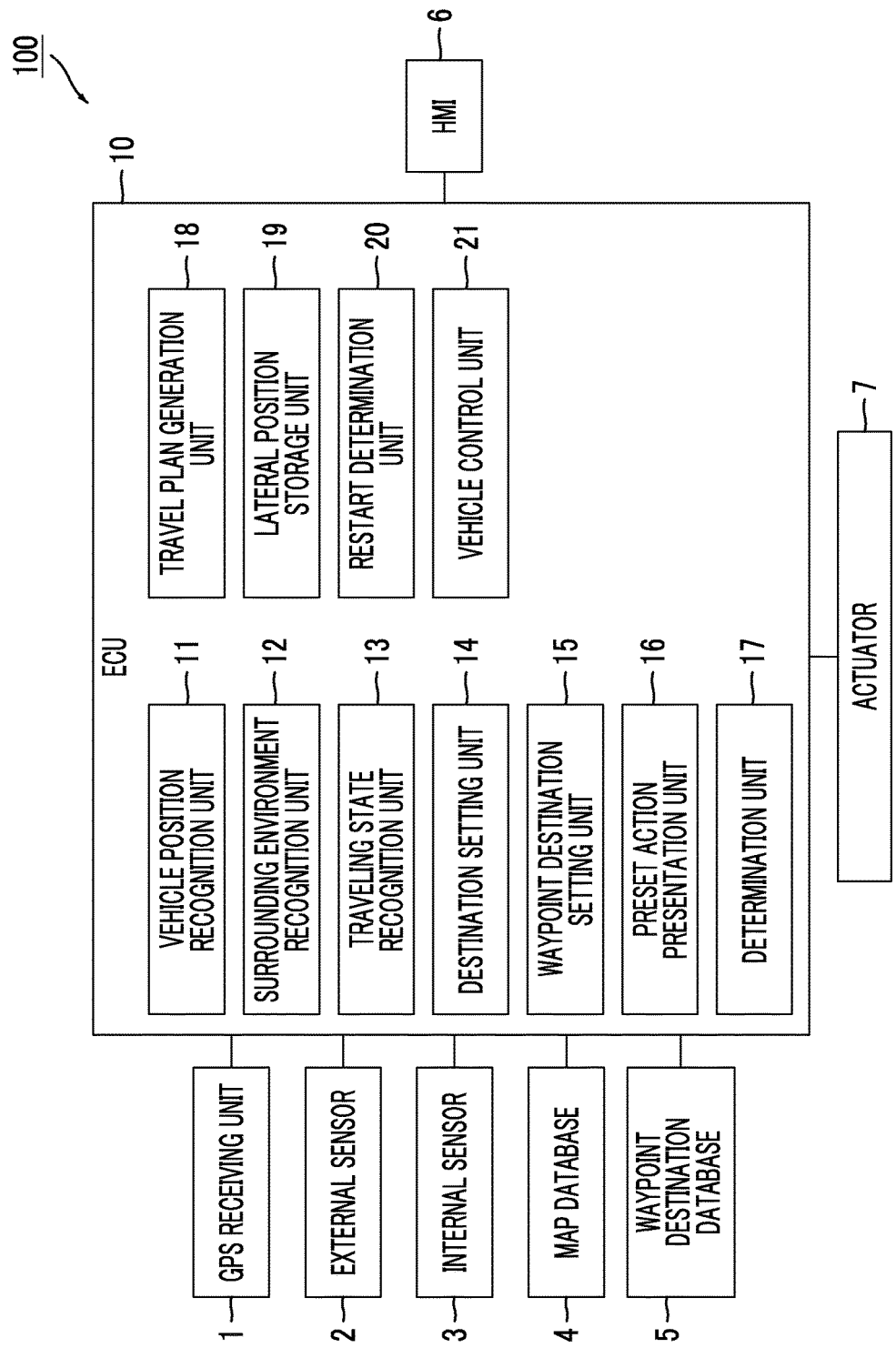
FIG. 1 is a block diagram showing an autonomous driving system according to a first embodiment.

FIG. 1 is a block diagram showing an autonomous driving system 100 according to a first embodiment. The autonomous driving system 100 shown in FIG. 1, mounted in a vehicle such as a passenger car, is a system for allowing a vehicle to drive autonomously. The autonomous driving system 100 starts the autonomous driving of a vehicle when an occupant performs the autonomous driving start operation (for example, the occupant presses the autonomous driving start button).

Autonomous driving refers to vehicle control for causing a vehicle to travel autonomously toward a destination that is set in advance. Autonomous driving allows the vehicle to travel autonomously with no need for the driver to drive the vehicle. The destination may be set by an occupant of the vehicle or may be set autonomously by the autonomous driving system 100 using a known method.

In the autonomous driving system 100, not only a destination but also a waypoint destination can be set. A waypoint destination refers to a location via which the vehicle will travel during autonomous driving from the current position to the destination. Examples of waypoint destinations include a gas station, a charging facility, a school, a hospital, a station, a supermarket, a restaurant, and a convenience store. An address may also be set as a waypoint destination.

[Configuration of the Autonomous Driving System]

As shown in FIG. 1, the autonomous driving system 100 includes an Electronic Control Unit [ECU] 10 that integrally manages the system. The ECU 10 is an electronic control unit having a Central Processing Unit [CPU], a Read Only Memory [ROM], a Random Access Memory [RAM], a Controller Area Network [CAN] communication circuit, and so on. The ECU 10 implements various functions, for example, by loading a program, stored in the ROM, into the RAM and then executing the program, loaded in the RAM, by the CPU. The ECU 10 may be configured by a plurality of electronic units.

The ECU 10 is connected to a GPS receiving unit 1, an external sensor 2, an internal sensor 3, a map database 4, a waypoint destination database 5, a Human Machine Interface [HMI] 6, and an actuator 7.

The GPS receiving unit 1 receives signals from three or more GPS satellites to measure the vehicle position (for example, the latitude and longitude of the vehicle). The GPS receiving unit 1 sends the information on the measured vehicle position to the ECU 10.

The external sensor 2 is a detector that detects the situation around the vehicle. The external sensor 2 includes at least one of a camera and a radar sensor.

The camera is a capturing device for capturing the external situation of the vehicle. The camera is provided on the interior side of the windshield of the vehicle. The camera sends the captured information on the external situation of the vehicle to the ECU 10. The camera may be a monocular camera or a stereo camera. The stereo camera has two capturing units arranged to reproduce the disparity between the right eye and the left eye. The information captured by the stereo camera also includes the information on the depth direction.

The radar sensor is a detector that detects obstacles around the vehicle using radio waves (for example, millimeter waves) or light. Examples of radar sensors include a millimeter wave radar, a Light Detection and Ranging [LIDAR], and so on. The radar sensor sends radio waves or light to the surroundings of the vehicle to detect an obstacle by receiving the radio waves or light reflected by the obstacle. The radar sensor sends the detected obstacle information to the ECU 10. Examples of obstacles include fixed obstacles such as a guardrail and a building, and moving obstacles such as a pedestrian, a bicycle, and other vehicles.

The internal sensor 3 is a detector that detects the travelling state and the vehicle state of the host vehicle. The internal sensor 3 includes a vehicle speed sensor, an acceleration sensor, and a yaw rate sensor. The vehicle speed sensor is a detector that detects the speed of the host vehicle. An example of the vehicle speed sensor is a wheel speed sensor that is provided on the wheels of the host vehicle, or on the drive shaft that rotates in synchronization with the wheels, to detect the rotation speed of the wheels. The vehicle speed sensor sends the detected vehicle speed information (wheel speed information) to the ECU 10.

The acceleration sensor is a detector that detects the acceleration of the host vehicle. The acceleration sensor includes, for example, a longitudinal acceleration sensor for detecting the acceleration in the longitudinal direction of the host vehicle and a lateral acceleration sensor for detecting the lateral acceleration of the host vehicle. The acceleration sensor sends the acceleration information on the host vehicle to the ECU 10. The yaw rate sensor is a detector that detects the yaw rate (rotational angular velocity) around the vertical axis at the center of gravity of the host vehicle. As the yaw rate sensor, a gyro sensor may be used. The yaw rate sensor sends the detected yaw rate information on the host vehicle to the ECU 10.

The internal sensor 3 includes two types of sensors for detecting the vehicle state: one is the door sensor for detecting whether the door is opened or closed and the other is the seat belt sensor for detecting whether the occupants have their seat belts on.

The map database 4 is a database that stores map information. The map database 4 is formed, for example, in a hard disk drive (HDD) mounted on the vehicle. The map information includes the position information on roads, information on road shapes (for example, information as to whether the road is a curved road or a straight road, the curvature of a curve), position information on intersections and branching points, and position information on structures. The map information also includes traffic regulation information such as the legal speed limits associated with the position information. The map information also includes facility data such as the positions of facilities and the types of facilities (school, hospital, station, convenience store, etc.). The facility data also includes the parking space information on each facility (information as to whether there is a parking space, position information on parking space, etc.). The map database 4 may be stored in a computer of the facilities such as the management center that can communicate with the vehicle.

The waypoint destination database 5 is a database that stores waypoint destination data. The waypoint destination data refers to data created by associating a type of a waypoint destination with a preset action of the vehicle. There are two types of waypoint destinations: a parking space available location and a road shoulder stop location. The parking space available location is a type of a waypoint destination that has a parking space where a vehicle can be parked. More specifically, examples of parking space available locations include a gas station, a charging facility, a hospital, a supermarket, a restaurant, and a convenience store.

The road shoulder stop location is a type of a waypoint destination that does not have a parking space and requires a vehicle to stop temporarily on the road shoulder of the road. More specifically, examples of road shoulder stop locations include a station without a parking space and a school without a parking space. At a road shoulder stop location, a situation is assumed in which the vehicle temporarily stops for picking up and dropping off passengers (for taking children to and from school, taking people to and from hospitals etc.). Road shoulder stop locations may include a waypoint destination that has a parking space but that cannot be used because other vehicles have been parked therein. Road shoulders mentioned here include an emergency parking zone formed by partially widening the road width.

The waypoint destination data also includes the classification information on the type of a waypoint destination. The waypoint destination database 5 may be stored in a computer of facilities such as the management center capable of communicating with the vehicle. The waypoint destination database 5 may be a database integrated with the map database 4.

The preset action is an action that an autonomously driven vehicle performs at a waypoint destination. In the waypoint destination database 5, at least one preset action is associated with each type of waypoint destination. More specifically, engine-off parking and engine-on parking are associated with a parking space available location as the preset action. A hazard-light-on stop is associated with a road shoulder stop location as the preset action. Engine-off parking is an action that the autonomously driven vehicle is parked with the engine turned off. Engine-on parking is an action that the autonomously driven vehicle is parked with the engine turned on. A hazard-light-on stop is an action that the autonomously driven vehicle is stopped with the hazard light turned on (or with the hazard light blinking).

When the vehicle performs any of the preset actions (engine-off parking, engine-on parking, hazard-light-on stop), the door may be unlocked after the vehicle stops. Also, the occupant's seat belts may be released, and the door may be opened and closed, automatically. Note that only one of engine-off parking and engine-on parking may be associated with a parking space available location as the preset action.

The HMI 6 is an interface for inputting and outputting information between the autonomous driving system 100 and an occupant. The HMI 6 includes, for example, a display, a speaker, a touch panel, a voice recognition unit, and so on. The HMI 6 outputs an image on the display, and outputs sound from the speaker, in response to the control signal from the ECU 10.

The actuator 7 is a device used to control the vehicle. The actuator 7 at least includes a throttle actuator, a brake actuator, and a steering actuator. The throttle actuator controls the amount of air to be supplied to the engine (throttle angle) in response to the control signal from the ECU 10 for controlling the driving force of the vehicle. When the vehicle is a hybrid vehicle, the control signal is input from the ECU 10 not only to the engine to control the amount of air to be supplied to the engine, but also to the motor that works as the power source, for controlling the driving force. When the vehicle is an electric vehicle, the control signal is input from the ECU 10 to the motor that works as the power source for controlling the driving force. The motor used as the power source in these cases constitutes the actuator 7.

The brake actuator controls the brake system in response to the control signal from the ECU 10 for controlling the braking force to be applied to the wheels of the vehicle. For example, a hydraulic brake system can be used as the brake system. The steering actuator controls the driving of the assist motor, which controls the steering torque in the electric power steering system, according to the control signal from the ECU 10. Thus, the steering actuator controls the steering torque of the vehicle. The actuator 7 also includes a lighting control unit that controls the lighting of the hazard light, direction indicator, and headlight of the vehicle.

Next, the functional configuration of the ECU 10 will be described. The ECU 10 includes a vehicle position recognition unit 11, a surrounding environment recognition unit 12, a traveling state recognition unit 13, a destination setting unit 14, a waypoint destination setting unit 15, a preset action presentation unit 16, a determination unit 17, a travel plan generation unit 18, a lateral position storage unit 19, a restart determination unit 20, and a vehicle control unit 21. Note that a part of the functions of the ECU described below may be executed in a server of facilities such as the management center capable of communicating with the vehicle.

The vehicle position recognition unit 11 recognizes the position of the vehicle on the map based on the position information received by the GPS receiving unit 1 and the map information stored in the map database 4. In addition, the vehicle position recognition unit 11 recognizes the position of the vehicle by the Simultaneous Localization and Mapping [SLAM] technology, using the position information on fixed obstacles (such as telephone poles) included in the map information of the map database 4 and the detection result detected by the external sensor 2. The vehicle position recognition unit 11 may recognize the position of the vehicle on the map by other known methods.

The vehicle position recognition unit 11 recognizes the lateral position of the vehicle based on the detection result of the external sensor 2. The lateral position of the vehicle is the position of the vehicle in the lane width direction of the traveling lane in which the vehicle is traveling. The lane width direction is the direction perpendicular to the white lines, which form a lane of the road, on the road surface. For example, the vehicle position recognition unit 11 recognizes the white lines based on the detection result of the external sensor 2 and, based on the positional relationship between the white lines of the traveling lane and the vehicle, recognizes the lateral position of the vehicle.

The surrounding environment recognition unit 12 recognizes the surrounding environment of the vehicle based on the detection result of the external sensor 2. The surrounding environment includes the position of an obstacle relative to the vehicle, the relative speed of the obstacle with respect to the vehicle, the movement direction of the obstacle with respect to the vehicle, and so on. The surrounding environment recognition unit 12 recognizes the surrounding environment of the vehicle by a known method based on the image captured by the camera and the obstacle information sensed by the radar sensor.

The traveling state recognition unit 13 recognizes the traveling state of the vehicle based on the detection result of the internal sensor 3. The traveling state includes the vehicle speed of the vehicle, the acceleration of the vehicle, and the yaw rate of the vehicle. More specifically, the traveling state recognition unit 13 recognizes the vehicle speed of the vehicle based on the vehicle speed information sensed by the vehicle speed sensor. The traveling state recognition unit 13 recognizes the acceleration of the vehicle based on the vehicle speed information sensed by the acceleration sensor. The traveling state recognition unit 13 recognizes the direction of the vehicle based on the yaw rate information sensed by the yaw rate sensor.

The destination setting unit 14 sets the destination of autonomous driving. When the occupant enters a destination on the touch panel, or via voice, through the HMI 6, the destination setting unit 14 sets the entered destination as the destination of autonomous driving based on the map information stored in the map database 4.

The destination setting unit 14 may propose a destination by a known method. The destination setting unit 14 may propose a destination by referencing the position of the vehicle on the map, recognized by the vehicle position recognition unit 11, based on the traveling history of the vehicle. The destination setting unit 14 sends the control signal to the HMI 6 to propose a destination to the occupant using at least one of an image display and a voice output. When permission is obtained from the occupant for the proposed destination, the destination setting unit 14 sets the proposed destination as the destination of autonomous driving. The occupant enters permission for the destination through the HMI 6. In addition, the destination setting unit 14 may automatically set the destination by a known method.

The waypoint destination setting unit 15 sets a waypoint destination of autonomous driving. When the occupant enters a waypoint destination on the touch panel, or via voice, through the HMI 6, the waypoint destination setting unit 15 sets the entered waypoint destination as the waypoint destination of autonomous driving based on the map information stored in the map database 4.

When the occupant enters a destination on the touch panel through the HMI 6, the waypoint destination setting unit 15 may propose a waypoint destination based on the map information and the position of the vehicle on the map. For example, the waypoint destination setting unit 15 proposes a waypoint destination that is present between the position of the vehicle on the map and the destination. The waypoint destination setting unit 15 sends the control signal to the HMI 6 to propose a waypoint destination to the occupant using at least one of an image display and a voice output. The waypoint destination setting unit 15 may propose a waypoint destination based on the traveling history of the vehicle.

When permission is obtained from the occupant for the proposed waypoint destination, the waypoint destination setting unit 15 sets the proposed waypoint destination as the waypoint destination of autonomous driving. The occupant enters permission for the waypoint destination, for example, through the HMI 6. The waypoint destination setting unit 15 may set two or more waypoint destinations for each autonomous driving trip. The waypoint destination setting unit 15 may set a waypoint destination when autonomous driving is started or may set a waypoint destination in response to an occupant's input during autonomous driving.

The preset action presentation unit 16 recognizes the type of a waypoint destination, based on the map information and on the waypoint destination data stored in the waypoint destination database 5, when the waypoint destination is set by the waypoint destination setting unit 15. The preset action presentation unit 16 recognizes whether the type of the waypoint destination, which has been set, is a parking space available location or a road shoulder stop location, based on the information on the facility type (whether the facility is a school, a hospital, a station, or a convenience store, etc.) included in the facility data of the map information and based on the division information on the waypoint destination type included in the waypoint destination data. Note that the types of waypoint destinations may be included in advance in the facility data of the map information. In this case, the preset action presentation unit 16 can recognize the type of a waypoint destination from the map information.

When the type of a waypoint destination is recognized, the preset action presentation unit 16 presents a preset action, associated with the type of the waypoint destination, to the occupant based on the waypoint destination data stored in the waypoint destination database 5. The preset action presentation unit 16 sends the control signal to the HMI 6 to propose the preset action to the occupant using at least one of an image display and a voice output. The preset action presentation unit 16 proposes at least one preset action.

More specifically, when the type of the waypoint destination is a parking space available location, the preset action presentation unit 16 proposes engine-off parking and engine-on parking as the preset action. When the type of the waypoint destination is a road shoulder stop location, the preset action presentation unit 16 proposes a hazard-light-on stop as the preset action. The preset action presentation unit 16 does not have to propose a preset action when the type of the waypoint destination cannot be recognized, for example, when the waypoint destination is set by entering an address.

The determination unit 17 determines whether the preset action that is presented by the preset action presentation unit 16 is permitted by the occupant. The determination unit 17 determines whether the presented preset action is permitted by the occupant by checking an occupant's input (through the touch panel or via voice) to the HMI 6. For example, one preset action is permitted for each waypoint destination. If it is determined that the preset action is permitted by the occupant, the determination unit 17 sets the permitted preset action as the preset action to be performed at the waypoint destination.

If the occupant does not permit the presented preset action within a predetermined time after the preset action presentation unit 16 presents the preset action or if the occupant enters a response indicating that the preset action is not permitted, the determination unit 17 determines that the preset action is not permitted by the occupant.

The travel plan generation unit 18 generates a travel plan of the vehicle based on the destination, the waypoint destination, the map information, the position of the vehicle on the map, the surrounding environment of the vehicle, and the traveling state of the vehicle. When a waypoint destination is set, the travel plan generation unit 18 generates a target route from the current position of the vehicle on the map to the destination via the waypoint destination. The travel plan generation unit 18 generates a travel plan that allows the vehicle to autonomously travel along the target route. The travel plan generation unit 18 generates a target route and a travel plan by a known method. Note that a known navigation system may also be used to generate a target route.

For example, a travel plan includes the control target value of the vehicle for a position on the target route of the vehicle. The positions on the target route are positions in the extending direction of the target route on the map. The positions on the target route mean the set longitudinal positions that are set at predetermined intervals (for example, at one-meter intervals) in the extending direction of the target route. The control target value is the value of a control target of the vehicle used in the travel plan. The control target value is set in association with each set longitudinal position on the target route. The travel plan generation unit 18 generates a travel plan by setting the set longitudinal positions at predetermined intervals on the target route R and, at the same time, by setting the control target value (for example, the target lateral position and the target vehicle speed) for each set longitudinal position. The set longitudinal position and the target lateral position may be set by combining into one set of positional coordinates. The set longitudinal position and the target lateral position mean the longitudinal position information and the lateral position information that are set as a target in the travel plan.

If it is determined by the determination unit 17 that the preset action is permitted by the occupant, the travel plan generation unit 18 generates a travel plan so that the vehicle performs the permitted preset action at the corresponding waypoint destination. If the permitted preset action is engine-off parking, the travel plan generation unit 18 generates a travel plan that causes the vehicle to be parked in the parking space of the waypoint destination (parking space available location) and then to stop the engine. If the permitted preset action is engine-on parking, the travel plan generation unit 18 generates a travel plan that causes the vehicle to be parked in the parking space of the waypoint destination (parking space available location) with the engine turned on. The travel plan generation unit 18 uses a known method (for example, a method of parking control technology) to generate a travel plan that carries out engine-off parking and engine-on parking.

If the permitted preset action is a hazard-light-on stop, the travel plan generation unit 18 generates a travel plan that causes the vehicle to stop on the road shoulder at the waypoint destination (road shoulder stop location) with the hazard light of the vehicle turned on.

Figure 2:
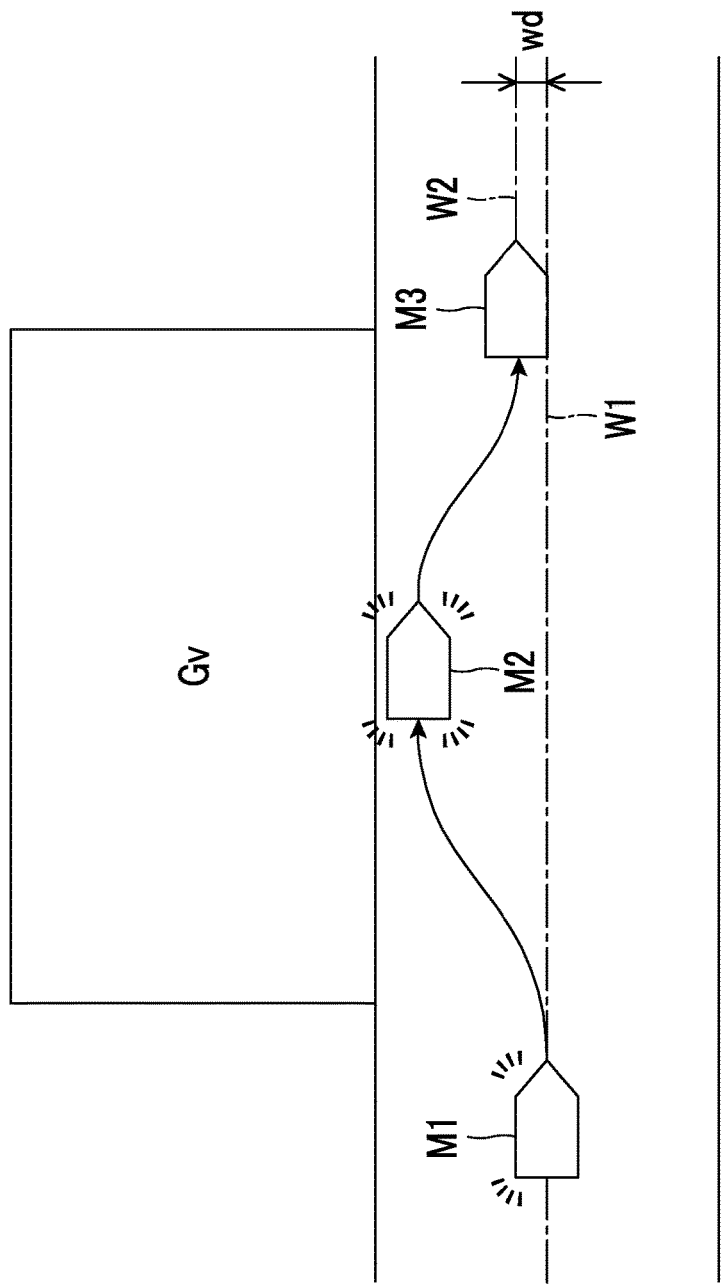
FIG. 2 is a plan view showing a hazard-light-on stop at a road shoulder stop location.

FIG. 2 is a plan view showing a hazard-light-on stop at a road shoulder stop location. FIG. 2 shows the position M1 of the vehicle where the vehicle starts the hazard-light-on stop, the position M2 of the vehicle in the stopped state by the hazard-light-on stop, the position M3 of the vehicle where the vehicle turns off the hazard light after restarting, and the waypoint destination (road shoulder stop location) Gv. In addition, FIG. 2 shows the lateral position W1 of the vehicle corresponding to the position M1 of the vehicle, the lateral position W2 of the vehicle corresponding to the position M3 of the vehicle, and the difference wd between the lateral position W1 and the lateral position W2. The lateral position W1 of the vehicle is the lateral position of the vehicle when the hazard-light-on stop is started. The lateral position W2 of the vehicle is the lateral position of the vehicle when the hazard light is turned off.

As shown in FIG. 2, the vehicle starts the hazard-light-on stop at the position M1. The vehicle travels to the road shoulder adjacent to the waypoint destination Gv with the hazard light turned on. The vehicle stops at the position M2 with the hazard light turned on. After that, the vehicle restarts and turns off the hazard light at the position M3.

The position M1 is a position, for example, at a fixed distance from the waypoint destination Gv. The position M2 is the stop position on the road shoulder that is set at the waypoint destination (road shoulder stop location). The position M2 may be changed according to the surrounding environment, for example, when another vehicle is stopped. The position M3 is a position where the difference wd between the lateral position of the vehicle after the vehicle is restarted and the lateral position W1 where the vehicle started the hazard-light-on stop becomes less than the first threshold value. The first threshold value is a value that is set in advance. The first threshold value may be changed in accordance with the road width and so on.

When the vehicle arrives at the position M1 at a certain distance from the waypoint destination Gv, the travel plan generation unit 18 generates a travel plan that causes the vehicle to start the hazard-light-on stop and then to stop at the position M2 with the hazard light turned on. When the difference wd between the lateral position of the vehicle after the restart and the lateral position W1 of the vehicle at the start of the hazard-light-on stop becomes less than the first threshold value, the travel plan generation unit 18 generates a travel plan that turns off the hazard light. The hazard light turn-off operation is not necessarily included in the travel plan; this operation may be controlled by the vehicle control unit 21 that will be described later.

If a waypoint destination is set by the waypoint destination setting unit 15 but if it is not determined by the determination unit 17 that the preset action is permitted by the occupant, the travel plan generation unit 18 generates a travel plan that causes the vehicle to stop at the waypoint destination. In this case, note that the travel plan generation unit 18 does not necessarily need to generate a travel plan that causes the vehicle to stop at the waypoint destination. Instead, if it is not determined that the preset action is permitted by the occupant, the autonomous driving system 100 may ask the occupant about an action to be performed at the waypoint destination when the vehicle arrives near the waypoint destination.

The lateral position storage unit 19 stores the lateral position of the vehicle at the start of a hazard-light-on stop (lateral position W1 in FIG. 2) as the reference lateral position when the vehicle starts the hazard-light-on stop. Based on the lateral position of the vehicle recognized by the vehicle position recognition unit 11, the lateral position storage unit 19 stores the reference lateral position for each waypoint destination where a hazard-light-on stop is performed.

The restart determination unit 20 determines whether a preset restart condition is satisfied when the autonomously driven vehicle is parked or stopped. The restart condition means that all the doors of the vehicle are closed, that the occupants wear the seatbelt, that there is no pedestrian around the vehicle (for example, within one meter of the vehicle), and that the occupant has performed the restart operation. The restart operation may be an operation in which the occupant presses the autonomous driving start button again or may be a touch panel operation, or a voice input, through the HMI 6.

For example, the restart determination unit 20 determines whether the restart condition is satisfied, based on the detection result of the internal sensor 3 (the detection result of the door sensor, the detection result of the seatbelt sensor, etc.), an input from the occupant through the HMI 6, and the surrounding environment of the vehicle. The restart condition is not limited to the conditions described above.

The vehicle control unit 21 performs the autonomous driving of the vehicle. The vehicle control unit 21 sends the control signal to the actuator 7 to control the vehicle. The vehicle control unit 21 performs the autonomous driving of the vehicle based on the map information stored in the map database 4, the position of the vehicle on the map recognized by the vehicle position recognition unit 11, the surrounding environment of the vehicle recognized by the surrounding environment recognition unit 12, the traveling state of the vehicle recognized by the traveling state recognition unit 13, and the travel plan generated by the travel plan generation unit 18.

If it is determined by the determination unit 17 that the preset action is permitted by the occupant, the vehicle control unit 21 determines whether the vehicle has arrived near the waypoint destination based on the map information and the position of the vehicle on the map. The vehicle control unit 21 determines that the vehicle has arrived near the waypoint destination when the distance between the vehicle on the target route and the waypoint destination becomes equal to or less than a predetermined distance. When it is determined that the vehicle has arrived near the waypoint destination, the vehicle control unit 21 may notify the occupant, through the HMI 6, that the vehicle has arrived near the waypoint destination.

If it is determined that the vehicle has arrived near the waypoint destination, the vehicle control unit 21 controls the vehicle so that the preset action is performed at the waypoint destination based on the travel plan and the surrounding environment of the vehicle. When the permitted preset action is engine-off parking, the vehicle control unit 21 parks the vehicle in the parking space of the waypoint destination (parking space available location) and turns off the engine. When the permitted preset action is engine-on parking, the vehicle control unit 21 parks the vehicle in the parking space of the waypoint destination with the engine turned on. The vehicle control unit 21 parks the vehicle by applying the parking brake.

When the parking space scheduled in the travel plan is unavailable (for example, when another vehicle is parked), the vehicle control unit 21 uses a known method to search for a vacant parking space based on the surrounding environment of the vehicle and the map information. When there is a vacant parking space, the vehicle control unit 21 parks the vehicle in that parking space and stops the engine. When there is no vacant parking space, the vehicle control unit 21 may ask the occupant about the next action via the HMI 6.

When the permitted preset action is a hazard-light-on stop, the vehicle control unit 21 turns on the vehicle's hazard light and stops the vehicle on the road shoulder of the waypoint destination (road shoulder stop location) (see FIG. 2). When the road shoulder space scheduled in the travel plan is unavailable (for example, when another vehicle is parked), the vehicle control unit 21 searches for a vacant road shoulder space based on the surrounding environment of the vehicle and the map information. When there is a vacant parking space, the vehicle control unit 21 turns on the hazard light and then stops the vehicle in that road shoulder space. When there is no vacant road shoulder space, the vehicle control unit 21 may ask the occupant about the next action via the HMI 6.

The vehicle control unit 21 determines whether a predetermined time has passed since the hazard-light-on stop. If it is determined that a predetermined time has elapsed since the hazard-light-on stop, the vehicle control unit 21 stops the engine of the vehicle and then switches the state of the vehicle to the parking state. Note that the vehicle control unit 21 may also switch the state of the vehicle to the parking state by applying the parking brake with the engine turned on. The vehicle control unit 21 does not necessarily have to switch the state of the vehicle to the parking state after the predetermined time has elapsed.

If it is determined by the restart determination unit 20 that the restart condition is satisfied, the vehicle control unit 21 restarts the vehicle. The vehicle control unit 21 locks all the doors of the vehicle when the vehicle is restarted. The vehicle control unit 21 causes the restarted vehicle to travel toward the destination based on the travel plan.

After the hazard-light-on stop, the vehicle control unit 21 keeps the hazard light on continuously even after the vehicle is restarted. In this case, the vehicle control unit 21 determines whether the difference between the lateral position of the vehicle after the restart and the reference lateral position (lateral position of the vehicle at the start of the hazard-light-on stop) is less than the first threshold value. The vehicle control unit 21 makes the above determination based on the lateral position of the vehicle recognized by the vehicle position recognition unit 11 and the reference lateral position stored in the lateral position storage unit 19. The vehicle control unit 21 turns off the hazard light when it is determined that the difference between the lateral position of the vehicle and the reference lateral position becomes less than the first threshold value. The vehicle control unit 21 continues the autonomous driving of the vehicle according to the travel plan.

[Processing of the Autonomous Driving System]

Next, the processing of the autonomous driving system 100 according to the first embodiment will be described.

<Preset Action Setting Processing>

Figure 3:
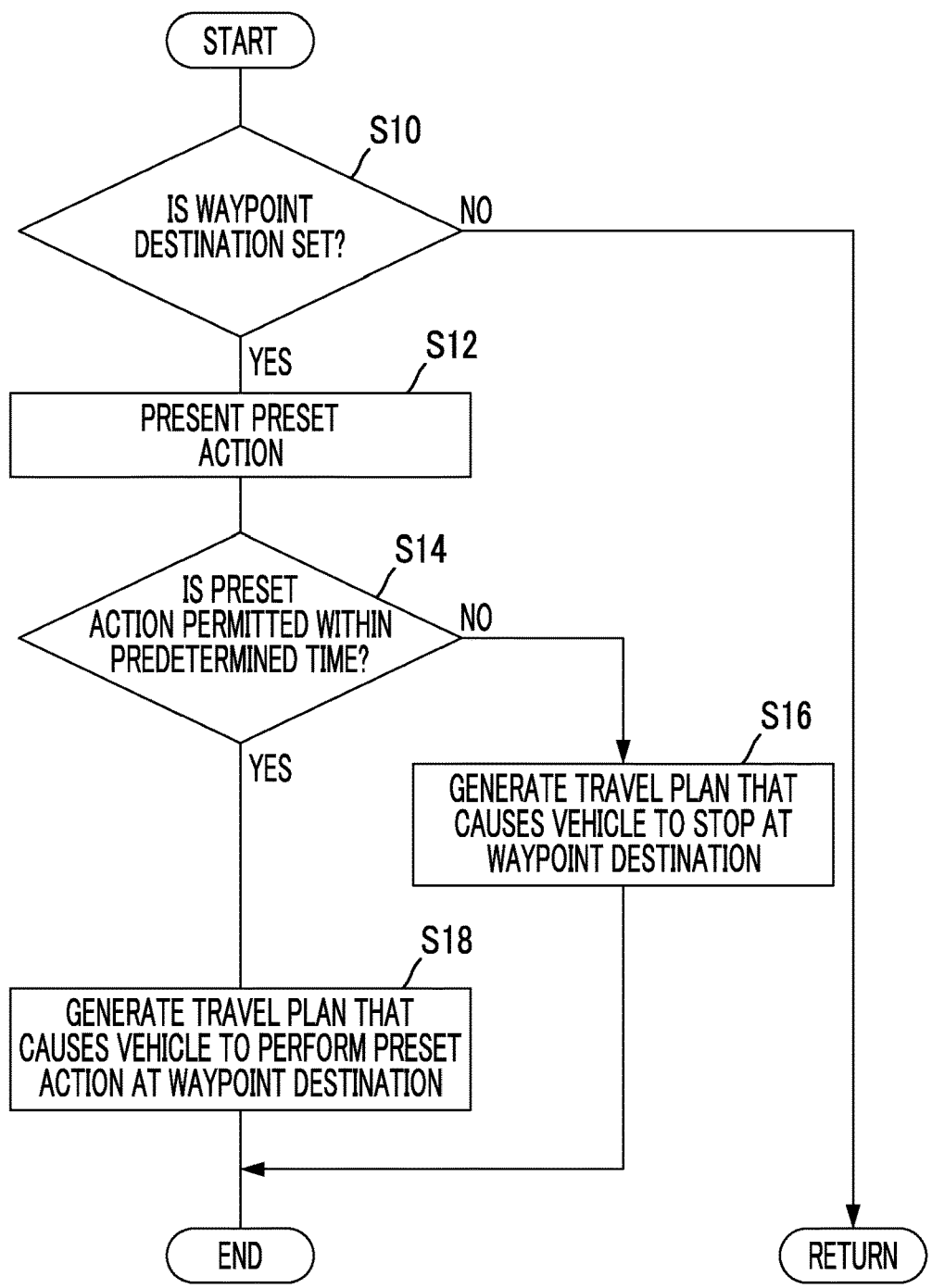
FIG. 3 is a flowchart showing preset action setting processing.

First, the preset action setting processing in the autonomous driving system 100 will be described. FIG. 3 is a flowchart showing the preset action setting processing. The flowchart shown in FIG. 3 is executed at the start of autonomous driving of the vehicle or during autonomous driving of the vehicle.

As shown in FIG. 3, in S10, the ECU 10 of the autonomous driving system 100 determines whether a waypoint destination is set by the waypoint destination setting unit 15. When the occupant enters a waypoint destination on the touch panel, or via voice, through the HMI 6, the waypoint destination setting unit 15 sets the entered waypoint destination as the waypoint destination of autonomous driving. If a waypoint destination is not set (S10: NO), the ECU 10 terminates the current processing. The ECU 10 repeats the determination in S10 again after a predetermined time elapses. If a waypoint destination is set (S10: YES), the processing of the ECU 10 proceeds to S12.

In S12, the ECU 10 uses the preset action presentation unit 16 to present the preset action. The preset action presentation unit 16 recognizes the type of the waypoint destination based on the map information, stored in the map database 4, and the waypoint destination data, stored in the waypoint destination database 5 and at the same time, notifies the occupant about the preset action associated with the type of the waypoint destination. The preset action presentation unit 16 sends the control signal to the HMI 6 to present the preset action to the occupant. When the type of the waypoint destination is a parking space available location, the preset action presentation unit 16 proposes engine-off parking and engine-on parking as the preset action. When the type of the waypoint destination is a road shoulder stop location, the preset action presentation unit 16 proposes a hazard-light-on stop as the preset action.

In S14, the ECU 10 uses the determination unit 17 to determine whether the preset action is permitted within a predetermined time. The determination unit 17 determines whether the occupant has entered an input to the HMI 6 (through the touch panel, via voice input, etc.) to indicate permission for the preset action. If it is not determined that the preset action is permitted within the predetermined time (S14: NO), the processing of the ECU 10 proceeds to S16. If it is determined that the preset action is permitted within the predetermined time (S14: YES), the processing of the ECU 10 proceeds to S18.

In S16, the ECU 10 uses the travel plan generation unit 18 to generate a travel plan that causes the vehicle to stop at the waypoint destination. The travel plan generation unit 18 generates the travel plan that causes the vehicle to stop at the waypoint destination, based on the map information, the position of the vehicle on the map, and the waypoint destination data. In this case, when there is no space (including a parking space) for stopping at the waypoint destination, the ECU 10 may ask the occupant about the next action when the vehicle has arrived near the waypoint destination. After generating the travel plan, the ECU 10 terminates the current preset action setting processing.

In S18, the ECU 10 uses the travel plan generation unit 18 to generate a travel plan that causes the vehicle to perform the preset action at the waypoint destination. The travel plan generation unit 18 generates the travel plan that causes the vehicle to perform the preset action at the waypoint destination, based on the map information, the position of the vehicle on the map, and the waypoint destination data. After generating the travel plan, the ECU 10 terminates the current processing.

<Preset Action Performing Processing>

Figure 4B:
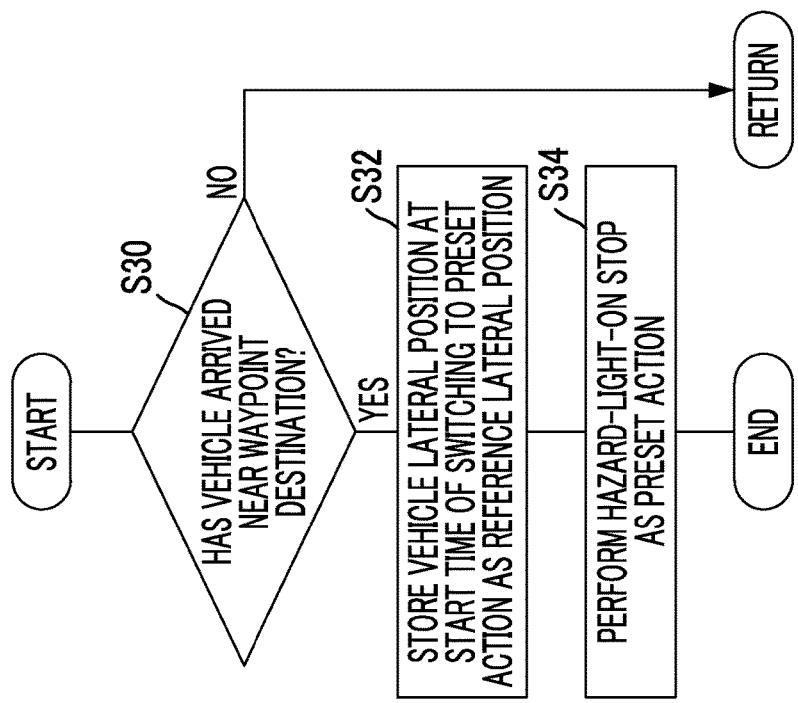
FIG. 4B is a flowchart showing hazard-light-on stop processing.
Figure 4A:
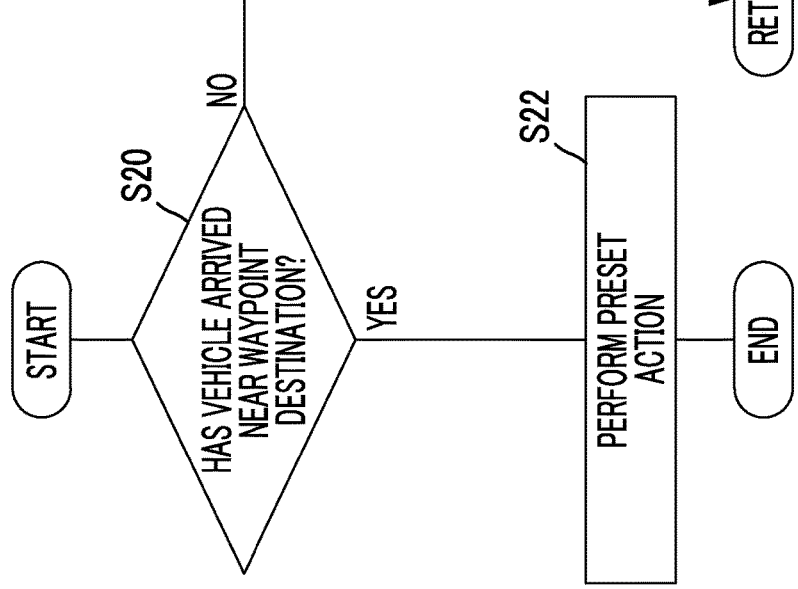
FIG. 4A is a flowchart showing preset action performing processing.

Next, the preset action performing processing in the autonomous driving system 100 will be described. FIG. 4A is a flowchart showing the preset action performing processing. In the description below, the preset actions other than a hazard-light-on stop will be described below. The flowchart shown in FIG. 4A is executed when a travel plan that causes the vehicle to perform a preset action other than a hazard-light-on stop is generated in S18 in FIG. 3 and the vehicle is driven autonomously according to the generated travel plan.

As shown in FIG. 4A, in S20, the ECU 10 uses the vehicle control unit 21 to determine whether the vehicle has arrived near the waypoint destination. The vehicle control unit 21 determines that the vehicle has arrived near the waypoint destination when the distance between the vehicle on the target route and the waypoint destination becomes equal to or less than a predetermined distance. If it is not determined that the vehicle has arrived near the waypoint destination (S20: NO), the ECU 10 terminates the current processing. The ECU 10 repeats the determination in S20 again after a predetermined time elapses. If it is determined that the vehicle has arrived near the waypoint destination (S20: YES), the processing of the ECU 10 proceeds to S22.

In S22, the ECU 10 uses the vehicle control unit 21 to perform the preset action at the waypoint destination. The vehicle control unit 21 controls the vehicle so that the vehicle performs the preset action at the waypoint destination based on the travel plan and the surrounding environment of the vehicle. When engine-off parking is performed as the preset action, the vehicle control unit 21 parks the vehicle in the parking space of the waypoint destination (parking space available location) and stops the engine. When engine-on parking is performed as the preset action, the vehicle control unit 21 parks the vehicle in the parking space of the waypoint destination with the engine turned on. After that, the ECU 10 terminates the current preset action performing processing.

<Hazard-Light-on Stop Processing>

Next, the hazard-light-on stop processing in the autonomous driving system 100 will be described. FIG. 4B is a flowchart showing the hazard-light-on stop processing. The flowchart shown in FIG. 4B is executed when a travel plan that causes the vehicle to perform a hazard-light-on stop is generated in S18 in FIG. 3 and the vehicle is driven autonomously according to the generated travel plan.

As shown in FIG. 4B, in S30, the ECU 10 uses the vehicle control unit 21 to determine whether the vehicle has arrived near the waypoint destination. The vehicle control unit 21 determines that the vehicle has arrived near the waypoint destination when the distance between the vehicle on the target route and the waypoint destination becomes equal to or less than a predetermined distance. If it is not determined that the vehicle has arrived near the waypoint destination (S30: NO), the ECU 10 terminates the current processing. The ECU 10 repeats the determination in S30 again after a predetermined time elapses. If it is determined that the vehicle has arrived near the waypoint destination (S30: YES), the processing of the ECU 10 proceeds to S32.

In S32, the ECU 10 stores the lateral position of the vehicle at the start time of the hazard-light-on stop in the lateral position storage unit 19. The stored lateral position is used as the reference lateral position. The start time of the hazard-light-on stop may or may not coincide with the time it is determined that the vehicle has arrived near the waypoint destination (the time at which the determination is made in S30).

In S34, the ECU 10 uses the vehicle control unit 21 to perform the hazard-light-on stop at the waypoint destination. The vehicle control unit 21 stops the vehicle on the road shoulder of the waypoint destination (road shoulder stop location) with the hazard light of the vehicle turned on, based on the surrounding environment of the vehicle, the traveling state of the vehicle, and the travel plan. After that, the ECU 10 terminates the current hazard-light-on stop performing processing.

<Restart Processing after a Hazard-Light-on Stop>

Figure 5:
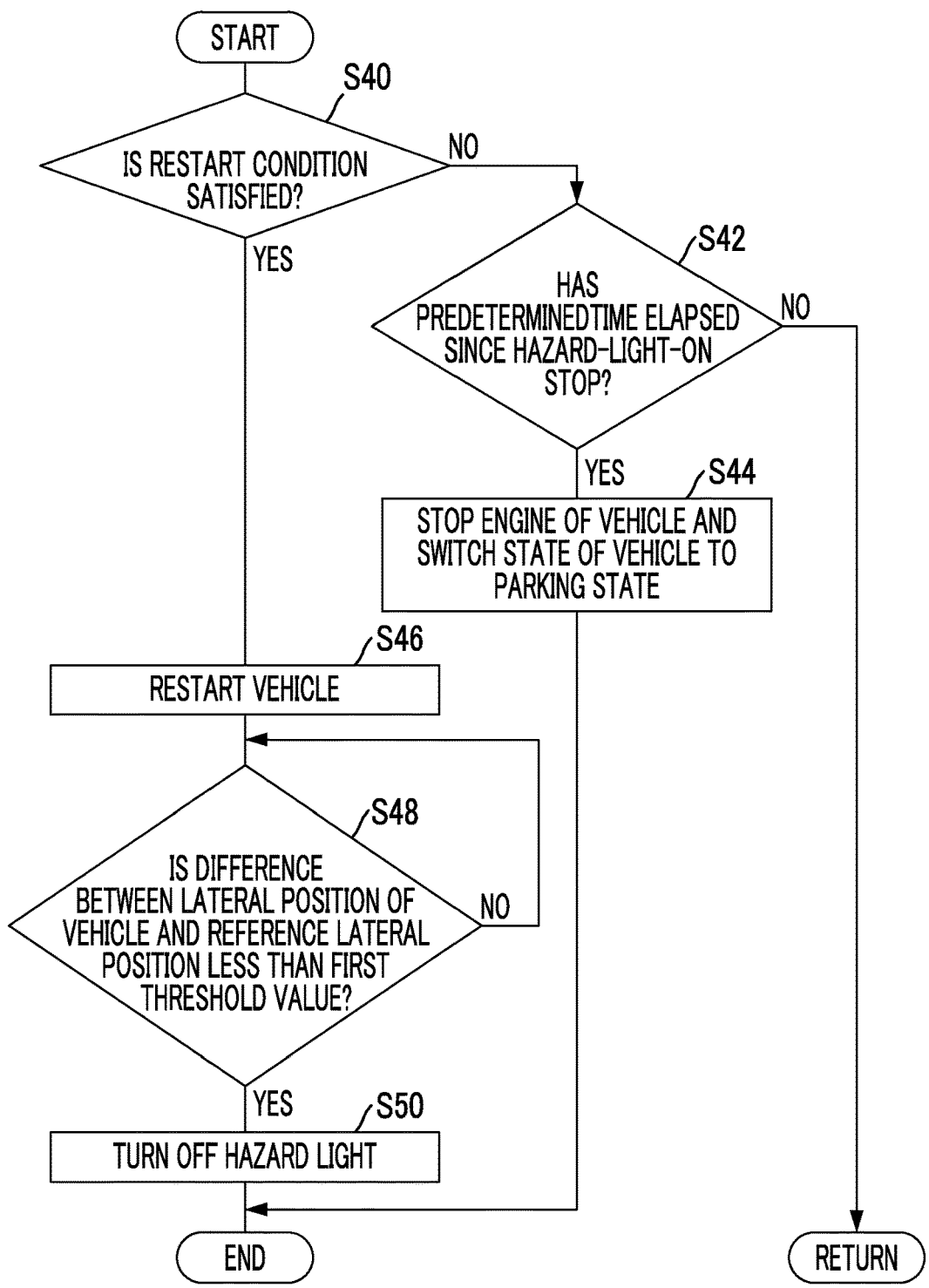
FIG. 5 is a flowchart showing restart processing after a hazard-light-on stop.

Next, the restart processing after a hazard-light-on stop in the autonomous driving system 100 will be described. FIG. 5 is a flowchart showing the restart processing after a hazard-light-on stop. The flowchart shown in FIG. 5 is executed in the stopped state by the hazard-light-on stop.

As shown in FIG. 5, in S40, the ECU 10 uses the restart determination unit 20 to determine whether the restart condition is satisfied. For example, the restart determination unit 20 determines whether the restart condition is satisfied based on the detection result of the internal sensor 3 (detection result of the door sensor, detection result of the seat belt sensor, etc.), the input from the HMI 6, and the surrounding environment of the vehicle. If it is determined that the restart condition is satisfied (S40: YES), the processing of the ECU 10 proceeds to S46. If it is not determined that the restart condition is satisfied (S40: NO), the processing of the ECU 10 proceeds to S42.

In S42, the ECU 10 uses the vehicle control unit 21 to determine whether a predetermined time has elapsed since the hazard-light-on stop. If it is not determined that the predetermined time has elapsed since the hazard-light-on stop (S42: NO), the ECU 10 terminates the current processing. After that, the ECU 10 repeats the determination in S40 again after a predetermined time elapses. If it is determined that the predetermined time has elapsed since the hazard-light-on stop (S42: YES), the processing of the ECU 10 proceeds to S44.

In S44, the ECU 10 uses the vehicle control unit 21 to stop the engine of the vehicle and switch the state of the vehicle to the parking state. The hazard light of the vehicle is turned off when the engine is stopped. After that, the ECU 10 terminates the current processing. In this case, the processing of the ECU 10 may proceed to the restart processing after engine-off parking. The restart processing after engine-off parking will be described later.

In S46, the ECU 10 uses the vehicle control unit 21 to restart the vehicle. The vehicle control unit 21 sends the control signal to the actuator 7 to restart the vehicle. The vehicle control unit 21 causes the re-started vehicle to travel toward the destination according to the travel plan.

In S48, the ECU 10 uses the vehicle control unit 21 to determine whether the difference between the lateral position of the vehicle and the reference lateral position becomes less than the first threshold value. More specifically, the vehicle control unit 21 determines whether the difference between the lateral position of the vehicle, recognized by the vehicle position recognition unit 11, and the reference lateral position, stored in the lateral position storage unit 19, becomes less than the first threshold value. The ECU 10 repeats the determination in S48 until it is determined that the difference between the lateral position of the vehicle and the reference lateral position becomes less than the first threshold value. If it is determined that the difference between the lateral position of the vehicle and the reference lateral position becomes less than the first threshold value (S48: YES), the processing of the ECU 10 proceeds to S50.

In S50, the ECU 10 uses the vehicle control unit 21 to turn off the hazard light of the vehicle. After that, the ECU 10 terminates the current processing. The vehicle control unit 21 causes the restarted vehicle to travel toward the destination based on the map information, the position of the vehicle on the map, the surrounding environment of the vehicle, the traveling state of the vehicle, and the travel plan.

Next, the restart processing after engine-off parking will be described with reference to FIG. 5. For example, the flowchart of the restart processing after engine-off parking is created by excluding S42, S44, S48, and S50 from the flowchart shown in FIG. 5 and by causing the processing to proceed to RETURN if the result of S40 is NO. That is, in the restart processing after engine-off parking, the ECU 10 repeats the determination in S40 if it is not determined that the restart condition is satisfied (S40: NO). If it is determined by the restart determination unit 20 that the restart condition is satisfied (S40: YES), the ECU 10 uses the vehicle control unit 21 to restart the vehicle. After that, the ECU 10 terminates the restart processing after engine-off parking. The restart processing after engine-on parking is similar to the restart processing after engine-off parking. Note that the restart processing after a hazard-light-on stop, the restart processing after engine-off parking, and the restart processing after engine-on parking may use restart conditions that are different from one another.

[Effect of the Autonomous Driving System in the First Embodiment]

When a waypoint destination is set, the autonomous driving system 100 in the first embodiment described above can present a preset action, associated with the type of the waypoint destination, to the occupant. When the occupant permits the preset action, the autonomous driving system 100 causes the vehicle to perform the preset action at the waypoint destination, allowing the vehicle to perform an appropriate action corresponding to the waypoint destination during autonomous driving.

In addition, when a road shoulder stop location is set as the waypoint destination and a hazard-light-on stop is permitted as the preset action, the autonomous driving system 100 can cause the vehicle to perform the hazard-light-on stop at the waypoint destination. Furthermore, after the vehicle that performed the hazard-light-on stop at the waypoint destination has restarted, the autonomous driving system 100 turns off the hazard light when the lateral position of the vehicle becomes almost coincident with the lateral position at the start of the hazard-light-on stop. This means that the hazard light of the vehicle that was turned on at the time of the hazard-light-on stop can be turned off at an appropriate timing.

Second Embodiment

Next, an autonomous driving system according to a second embodiment will be described. FIG. 6 is a block diagram showing an autonomous driving system 200 according to the second embodiment. The autonomous driving system 200 according to the second embodiment shown in FIG. 6 is different from the autonomous driving system 100 according to the first embodiment only in the processing for turning off the hazard light by a vehicle control unit 31. In FIG. 6, the same reference numeral is used for the same or equivalent component in the first embodiment and the duplicated description is omitted.

[Configuration of the Autonomous Driving System]

After a hazard-light-on stop, the vehicle control unit 31 of the ECU 30 in the second embodiment keeps the hazard light on continuously even after the vehicle is restarted. In this case, the vehicle control unit 31 determines whether the difference between the lateral position of the vehicle after the restart and the lateral position of the vehicle in the stopped state by the hazard-light-on stop becomes equal to or larger than a second threshold value. The second threshold value is a value that is set in advance. The second threshold value may be changed in accordance with the road width and so on.

The vehicle control unit 31 makes the above determination based on the lateral position of the vehicle recognized by the vehicle position recognition unit 11. If it is determined that the difference between the lateral position of the vehicle after the restart and the lateral position of the vehicle in the stopped state by the hazard-light-on stop becomes equal to or larger than the second threshold value, the vehicle control unit 31 turns off the hazard light. The vehicle control unit 31 continues the autonomous driving of the vehicle according to the travel plan.

[Processing of the Autonomous Driving System]

Next, the restart processing after a hazard-light-on stop of the autonomous driving system 200 according to the second embodiment will be described. The preset action setting processing, the preset action performing processing, the hazard-light-on stop processing, the restart processing after engine-off parking, and the restart processing after engine-on parking are the same as those in the first embodiment and, therefore, their description is omitted.

<Restart Processing after a Hazard-Light-on Stop>

FIG. 7 is a flowchart showing restart processing after a hazard-light-on stop according to the second embodiment. The flowchart shown in FIG. 7 is executed in the stopped state by a hazard-light-on stop.

As shown in FIG. 7, in S60, the ECU 30 uses the restart determination unit 20 to determine whether the restart condition is satisfied. If it is determined that the restart condition is satisfied (S60: YES), the processing of the ECU 30 proceeds to S66. If it is not determined that the restart condition is satisfied (S60: NO), the processing of the ECU 30 proceeds to S62.

In S62, the ECU 30 uses the vehicle control unit 31 to determine whether a predetermined time has elapsed since the hazard-light-on stop. If it is not determined that the predetermined time has elapsed since the hazard-light-on stop (S62: NO), the ECU 30 terminates the current processing. After that, the ECU 30 repeats the determination in S60 again after a predetermined time elapses. If it is determined that the predetermined time has elapsed since the hazard-light-on stop (S62: YES), the processing of the ECU 30 proceeds to S64.

In S64, the ECU 30 uses the vehicle control unit 31 to stop the engine of the vehicle and then switch the state of the vehicle to the parking state. The hazard light of the vehicle is turned off when the engine is stopped. After that, the ECU 30 terminates the current processing. In this case, the processing of the ECU 30 may proceed to the restart processing after engine-off parking.

In S66, the ECU 30 uses the vehicle control unit 31 to restart the vehicle. The vehicle control unit 31 sends the control signal to the actuator 7 to restart the vehicle. The vehicle control unit 31 causes the restarted vehicle to travel toward the destination according to the travel plan.

In S68, the ECU 30 uses the vehicle control unit 31 to determine whether the difference between the lateral position of the vehicle and the lateral position of the vehicle in the stopped state by the hazard-light-on stop becomes equal to or larger than the second threshold value. The vehicle control unit 31 makes the above determination based on the lateral position of the vehicle recognized by the vehicle position recognition unit 11. The ECU 30 repeats the determination in S68 until it is determined that the difference between the lateral position of the vehicle and the lateral position of the vehicle in the stopped state by the hazard-light-on stop becomes equal to or larger than the second threshold value. If it is determined that the difference between the lateral position of the vehicle and the lateral position of the vehicle in the stopped state by the hazard-light-on stop becomes equal to or larger than the second threshold value (S68: YES), the processing of the ECU 30 proceeds to S70.

In S70, the ECU 30 uses the vehicle control unit 31 to turn off the hazard light of the vehicle. After that, the ECU 30 terminates the current processing. The vehicle control unit 31 causes the restarted vehicle to travel toward the destination based on the map information, the position of the vehicle on the map, the surrounding environment of the vehicle, the traveling state of the vehicle, and the travel plan.

[Effect of the Autonomous Driving System in the Second Embodiment]

After a vehicle that performed a hazard-light-on stop at a waypoint destination has restarted, the autonomous driving system 200 according to the second embodiment described above turns off the hazard light when the difference between the lateral position of the vehicle and the lateral position of the vehicle in the stopped state by the hazard-light-on stop becomes equal to or larger than the second threshold value. This means that the hazard light of the vehicle that was turned on at the time of the hazard-light-on stop can be turned off at an appropriate timing.

Although preferred embodiments of the present disclosure have been described above, the present disclosure is not limited to the above-described embodiments. The present disclosure can be implemented not only by the above-described embodiments but also in various forms including various modifications and improvements based on the knowledge of those skilled in the art.

The waypoint destination setting unit 15 may automatically set a waypoint destination. The waypoint destination setting unit 15 may automatically set a waypoint destination in a way similar to that of a known method of automatically setting a destination. For example, the waypoint destination setting unit 15 may recognize the fuel amount (or the charged amount) of the vehicle based on the detection result of a known fuel sensor. The waypoint destination setting unit 15 may calculate the position of the vehicle on the map, the distance to the destination, and the fuel consumption amount (or power consumption amount) based on the map information and the position of the vehicle on the map and, if it is determined that the fuel consumption amount will become less than the predetermined value before arrival, may automatically set a gas station (or charging facility) as a waypoint destination.

The type of a waypoint destination may be switched depending on the expected arrival time of the autonomously driven vehicle at the waypoint destination. The expected arrival time is calculated by a navigation system or the like using a known method. For example, for an elementary school where there is a parking space, the type of the waypoint destination may be a road shoulder stop location when the expected arrival time is included in the commuting time to school, and may be a parking space available location when the expected arrival time is not included in the commuting time to school. In this case, the preset action presentation unit 16 can recognize the type of the waypoint destination based on the expected arrival time of the vehicle at the waypoint destination.

The types of preset actions may be further subdivided. For example, engine-off parking may be classified into two: one is first engine-off parking in which priority is given to a parking space near the entrance of a waypoint destination such as a supermarket and the other is second engine-off parking in which priority is given to shortest-time parking into a vacant parking space of a facility where congestion will likely to occur. This applies also to engine-on parking. A hazard-light-on stop may be classified into two: one is a first hazard-light-on stop in which the vehicle stops on the road shoulder adjacent to the facility entrance of a waypoint destination and the other is a second hazard-light-on stop in which the vehicle stops on the road shoulder a predetermined distance away from the facility entrance of a waypoint destination. Note that the preset actions do not have to include a hazard-light-on stop. The preset actions are only required to include any one of a hazard-light-on stop, engine-off parking, and engine-on parking.

When it is determined by the determination unit 17 that a preset action is permitted by the occupant, the travel plan generation unit 18 may generate a travel plan for performing a preset action at a waypoint destination in addition to a travel plan for traveling from the current position of the vehicle on the map to the destination via the waypoint destination. In this case, when the vehicle restarts after a hazard-light-on stop, the vehicle control unit 21 may turn off the hazard light when the autonomously driven vehicle finishes the travel plan for performing the preset action at the waypoint destination and then returns to the travel plan for traveling to the destination.

The vehicle control unit 21 may determine that the vehicle has arrived near a waypoint destination based, not on the distance to the waypoint destination, but on the remaining time to arrive at the waypoint destination. For example, when the remaining time to arrive at the waypoint destination becomes equal to or less than a certain threshold value while traveling according to the travel plan, the vehicle control unit 21 determines that the vehicle has arrived near the waypoint destination.

In addition, the vehicle control unit 21 may keep the hazard light on continuously even if the driving mode is switched from autonomous driving to the manual operation after a hazard-light-on stop. In this case, the vehicle control unit 21 automatically turns off the hazard light when the difference between the lateral position of the vehicle started in the manual operation mode and the reference lateral position becomes less than the first threshold value. Furthermore, the vehicle control unit 21 may turn off the hazard light when the rotation angle of the steering wheel operated by the driver becomes equal to or larger than a certain threshold value.

The method for determining when to turn off the hazard light in the first embodiment and the method for determining when to turn off the hazard light in the second embodiment may be combined. That is, the vehicle control unit 21 may turn off the hazard light when the difference between the lateral position of the vehicle after the restart and the reference lateral position becomes less than the first threshold value or when the difference between the lateral position of the vehicle after the restart and the lateral position of the vehicle in the stopped state by the hazard-light-on stop becomes equal to or larger than the second threshold value.

What is claimed is:

1. An autonomous driving system comprising:
   a waypoint destination database storing waypoint destination data, the waypoint destination data associating a type of a waypoint destination with a preset action of an autonomously driven vehicle, the waypoint destination being a destination that the autonomously driven vehicle visits before arriving at a predetermined destination, the preset action being an action that the autonomously driven vehicle performs at the waypoint destination; and an electronic control unit including a processor, programmed to:
   autonomously drive the autonomously driven vehicle toward the predetermined destination,
   set the waypoint destination,
   present the preset action, the preset action being performed at the waypoint destination, to an occupant of the autonomously driven vehicle, based on the waypoint destination and the waypoint destination data,
   determine whether the preset action is permitted by the occupant, and
   cause the autonomously driven vehicle to perform the preset action at the waypoint destination when it is determined that the preset action is permitted by the occupant.

2. The autonomous driving system according to claim 1, wherein
   in the waypoint destination database, the type of the waypoint destination includes a road shoulder stop location, and the preset action of the autonomously driven vehicle associated with the road shoulder stop location includes a hazard-light-on stop of the autonomously driven vehicle, the hazard-light-on stop being a stopped state in which the autonomously driven vehicle stops with a hazard light turned on or blinking,
   the electronic control unit is further programmed to:
   present the hazard-light-on stop to the occupant as the preset action when the type of the waypoint destination is the road shoulder stop location, and
   cause the autonomously driven vehicle to perform the hazard-light-on stop at the waypoint destination when it is determined that the hazard-light-on stop is permitted by the occupant.

3. The autonomous driving system according to claim 2, wherein
   the electronic control unit is further programmed to:
   store a lateral position of the autonomously driven vehicle at a start of the hazard-light-on stop as a reference lateral position when the autonomously driven vehicle performs the hazard-light-on stop at the waypoint destination,
   determine whether a preset restart condition is satisfied when the autonomously driven vehicle performs the hazard-light-on stop at the waypoint destination,
   restart the autonomously driven vehicle when it is determined that the preset restart condition is satisfied, and
   turn off the hazard light of the autonomously driven vehicle turned on at the time of the hazard-light-on stop, when a difference between a lateral position of the restarted autonomously driven vehicle and the reference lateral position becomes less than a first threshold value.

4. The autonomous driving system according to claim 2, wherein
   the electronic control unit is further programmed to:
   determine whether a preset restart condition is satisfied when the autonomously driven vehicle performs the hazard-light-on stop at the waypoint destination,
   restart the autonomously driven vehicle when it is determined that the preset restart condition is satisfied, and
   turn off the hazard light of the autonomously driven vehicle turned on at the time of the hazard-light-on stop, when a difference between a lateral position of the restarted autonomously driven vehicle and a lateral position of the autonomously driven vehicle in the stopped state by the hazard-light-on stop becomes equal to or larger than a second threshold value.

5. The autonomous driving system according to claim 2, wherein the road shoulder stop location includes a location where there is no available parking space.

6. The autonomous driving system according to claim 3, wherein whether the preset restart condition is satisfied is determined based on a detection result of a sensor mounted in the autonomously driven vehicle or based on whether or not a restart instruction is received from the occupant.

7. The autonomous driving system according to claim 4, wherein whether the preset restart condition is satisfied is determined based on a detection result of a sensor mounted in the autonomously driven vehicle or based on whether or not a restart instruction is received from the occupant.

8. The autonomous driving system according to claim 1, wherein in the waypoint destination database, the type of the waypoint destination includes a parking space available location having a parking space where the autonomously driven vehicle parks and the preset action of the autonomously driven vehicle associated with the parking space available location includes parking of the autonomously driven vehicle, the electronic control unit is further programmed to:
present the parking to the occupant as the preset action when the type of the waypoint destination is the parking space available location, and
cause the autonomously driven vehicle to perform the parking at the waypoint destination when it is determined that the parking is permitted by the occupant.

* * * * *